United States Patent
Srivastava et al.

(10) Patent No.: US 12,493,819 B2
(45) Date of Patent: Dec. 9, 2025

(54) UTILIZING MACHINE LEARNING MODELS TO GENERATE INITIATIVE PLANS

(71) Applicant: Accenture Global Solutions Limited, Dublin (IE)

(72) Inventors: Arpit Srivastava, Bengaluru (IN); Anil Vohra, Chinsurah-Mogra (IN); Deepa Yendigeri, Pune (IN); Bhudeep Hathi, Thane (IN); Sudip Kumar Paul, Bangalore (IN); Rohith Y. Nagaraj, Bangalore (IN); Amartya Sarkar, Navi Mumbai (IN); Saurav Kumar, Kundalahalli PO (IN); Nivas Nagarajan, Bengaluru (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 1130 days.

(21) Appl. No.: 17/201,578

(22) Filed: Mar. 15, 2021

(65) Prior Publication Data
US 2022/0292393 A1    Sep. 15, 2022

(51) Int. Cl.
*G06N 20/00* (2019.01)
*G06N 5/04* (2023.01)
(Continued)

(52) U.S. Cl.
CPC .............. *G06N 20/00* (2019.01); *G06N 5/043* (2013.01); *G06Q 10/0631* (2013.01); *G06Q 10/0637* (2013.01)

(58) Field of Classification Search
None
See application file for complete search history.

(56) References Cited

U.S. PATENT DOCUMENTS

| 7,546,246 B1 * | 6/2009 | Stamm | G06Q 10/06 |
| | | | 705/7.37 |
| 7,895,072 B1 * | 2/2011 | Manzi | G06Q 10/063 |
| | | | 700/95 |

(Continued)

FOREIGN PATENT DOCUMENTS

WO    WO-2021050053 A1 *    3/2021    .........    G06Q 10/1053

OTHER PUBLICATIONS

M. Tarafdar, C. M. Beath and J. W. Ross, "Enterprise Cognitive Computing Applications: Opportunities and Challenges," in IT Professional, vol. 19, No. 4, pp. 21-27, 2017 (Year: 2017).*

*Primary Examiner* — Mehmet Yesildag
*Assistant Examiner* — Philip N Warner
(74) *Attorney, Agent, or Firm* — Mannava & Kang, P.C.

(57) ABSTRACT

A device may receive and process client data, with a first machine learning model, to determine current state data identifying a current state of a client. The device may process the current state data and prior client data, with a second machine learning model, to determine a problem statement for the client and future state data of the client. The device may utilize the second machine learning model to identify initiatives for the client, and costs of the initiatives, based on the problem statement, the current state data, and the future state data, and to assign benefits and priorities to the initiatives. The device may process the initiatives, the benefits and priorities of the initiatives, and the costs of the initiatives, with the second machine learning model, to generate an initiative plan for solving a problem of the problem statement, and may perform actions based on the initiative plan.

16 Claims, 10 Drawing Sheets

(51) Int. Cl.
  *G06N 5/043* (2023.01)
  *G06Q 10/063* (2023.01)
  *G06Q 10/0631* (2023.01)
  *G06Q 10/0637* (2023.01)

(56) References Cited

U.S. PATENT DOCUMENTS

| | | | |
|---|---|---|---|
| 8,006,223 B2* | 8/2011 | Boulineau | G06Q 10/06313 |
| | | | 705/7.29 |
| 9,092,824 B2* | 7/2015 | Akkiraju | G06Q 10/06393 |
| 9,400,779 B2* | 7/2016 | Convertino | G06F 40/211 |
| 10,592,828 B2* | 3/2020 | Farooq | G06Q 30/0201 |
| 2003/0018510 A1* | 1/2003 | Sanches | G06Q 10/10 |
| | | | 717/102 |
| 2004/0002870 A1* | 1/2004 | Draper | G06Q 10/06313 |
| | | | 705/7.42 |
| 2004/0254806 A1 | 12/2004 | Schwerin-Wenzel et al. | |
| 2005/0114829 A1* | 5/2005 | Robin | G06Q 10/06 |
| | | | 717/101 |
| 2007/0033211 A1 | 2/2007 | Berman et al. | |
| 2009/0234701 A1* | 9/2009 | Amdall | G06Q 10/06 |
| | | | 705/7.37 |
| 2014/0358828 A1* | 12/2014 | Phillipps | G06N 20/00 |
| | | | 706/12 |
| 2016/0321935 A1* | 11/2016 | Mohler | G09B 5/08 |
| 2017/0293874 A1* | 10/2017 | Asaf | G06N 3/084 |
| 2019/0087756 A1* | 3/2019 | Hull | G06Q 10/06316 |
| 2019/0236620 A1* | 8/2019 | Knight | G06Q 30/0202 |
| 2019/0312793 A1 | 10/2019 | Hazen et al. | |
| 2020/0034758 A1* | 1/2020 | Byron | G06Q 10/063 |
| 2020/0210924 A1 | 7/2020 | Ghosh et al. | |
| 2020/0226506 A1* | 7/2020 | Srivastava | G06Q 30/0244 |
| 2021/0065091 A1* | 3/2021 | Bhattacharyya | |
| | | | G06Q 10/06375 |
| 2021/0192412 A1* | 6/2021 | Krishnaswamy | |
| | | | G06Q 10/06375 |
| 2021/0272040 A1* | 9/2021 | Johnson | G06N 5/022 |
| 2021/0295357 A1* | 9/2021 | Cleaver | G06Q 30/0202 |
| 2022/0086393 A1* | 3/2022 | Peters | H04N 7/147 |
| 2022/0139245 A1* | 5/2022 | Wilson | G06F 16/2457 |
| | | | 434/362 |
| 2022/0198562 A1* | 6/2022 | Cella | G06Q 40/04 |
| 2022/0270192 A1* | 8/2022 | Paz Erez | G06Q 10/0637 |
| 2022/0292393 A1* | 9/2022 | Srivastava | G06Q 10/0637 |

* cited by examiner

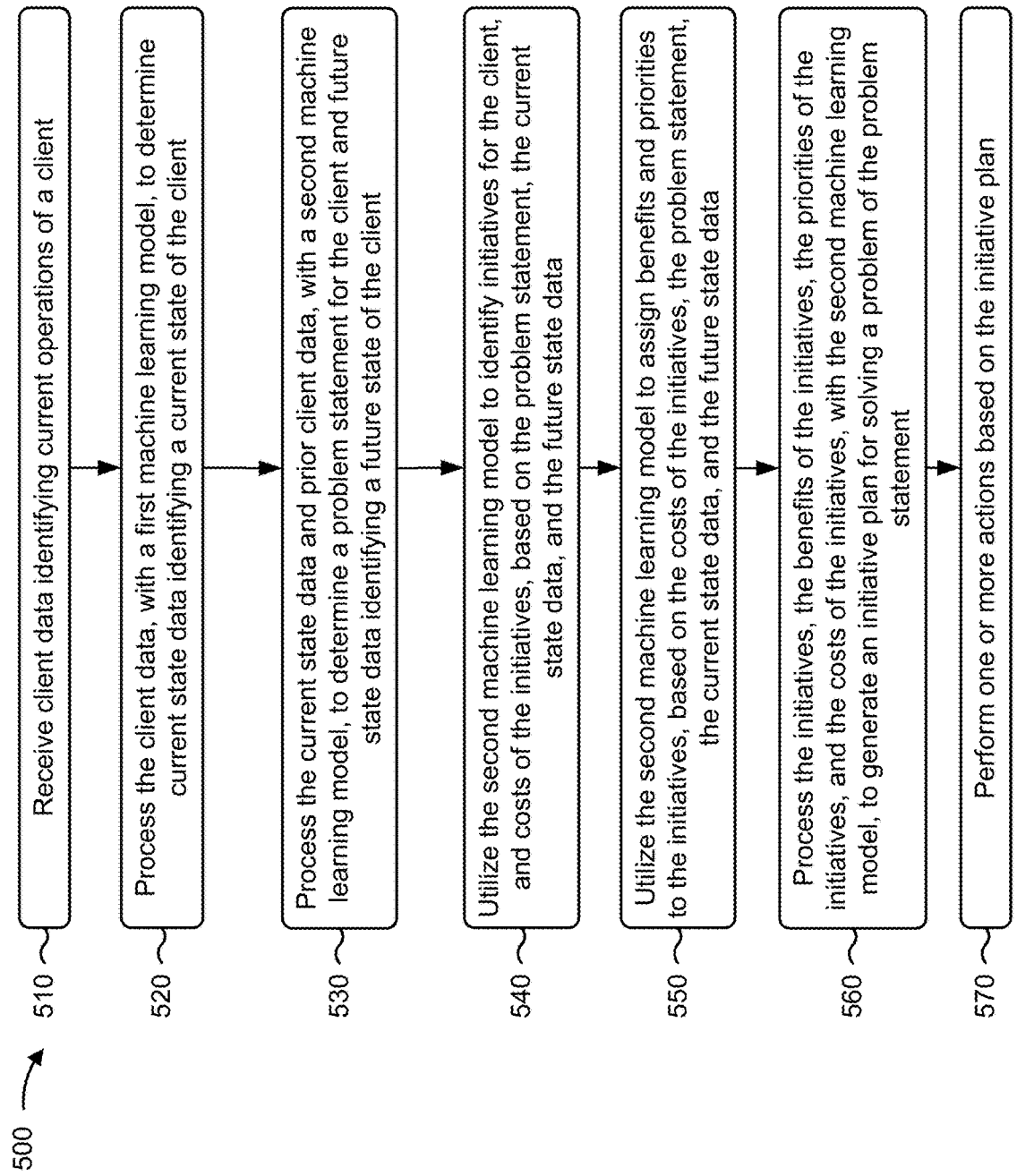

UTILIZING MACHINE LEARNING MODELS TO GENERATE INITIATIVE PLANS

BACKGROUND

An initiative plan can be a formal written document containing goals of an entity, methods for attaining those goals, and a time frame for achievement of the goals. The initiative plan can also describe a nature of the entity, background information on the entity, financial projections of the entity, strategies the entity intends to implement to achieve the goals, and/or the like.

SUMMARY

In some implementations, a method may include receiving client data identifying current operations of a client, and processing the client data, with a first machine learning model, to determine current state data identifying a current state of the client. The method may include processing the current state data and prior client data, with a second machine learning model, to determine a problem statement for the client and future state data identifying a future state of the client, wherein the prior client data identifies at least one of challenges, capabilities, processes, or key performance indicators associated with other clients. The method may include utilizing the second machine learning model to identify initiatives for the client, and costs of the initiatives, based on the problem statement, the current state data, and the future state data, and utilizing the second machine learning model to assign benefits and priorities to the initiatives, based on the costs of the initiatives, the problem statement, the current state data, and the future state data. The method may include processing the initiatives, the benefits of the initiatives, the priorities of the initiatives, and the costs of the initiatives, with the second machine learning model, to generate an initiative plan for solving a problem associated with the problem statement, and performing one or more actions based on the initiative plan.

In some implementations, a device may include one or more memories and one or more processors to receive client data identifying current operations of a client, and process the client data, with a first machine learning model, to determine current state data identifying a current state of the client. The one or more processors may process the current state data and prior client data, with a second machine learning model, to determine a problem statement for the client and future state data identifying a future state of the client, wherein the prior client data identifies at least one of challenges, capabilities, processes, or key performance indicators associated with other clients. The one or more processors may utilize the second machine learning model to identify initiatives for the client, and costs of the initiatives, based on the problem statement, the current state data, and the future state data, wherein the initiatives for the client include technological initiatives and non-technological initiatives that cause the client to achieve the future state. The one or more processors may utilize the second machine learning model to assign benefits and priorities to the initiatives, based on the costs of the initiatives, the problem statement, the current state data, and the future state data, and may process the initiatives, the benefits of the initiatives, the priorities of the initiatives, and the costs of the initiatives, with the second machine learning model, to generate an initiative plan for solving a problem associated with the problem statement. The one or more processors may perform one or more actions based on the initiative plan.

In some implementations, a non-transitory computer-readable medium may store a set of instructions that includes one or more instructions that, when executed by one or more processors of a device, cause the device to receive client data identifying current operations of a client, and process the client data, with a first machine learning model, to determine current state data identifying a current state of the client. The one or more instructions may cause the device to process the current state data and prior client data, with a second machine learning model, to determine a problem statement for the client and future state data identifying a future state of the client, wherein the prior client data identifies at least one of challenges, capabilities, processes, or key performance indicators associated with other clients. The one or more instructions may cause the device to utilize the second machine learning model to identify initiatives for the client, and costs of the initiatives, based on the problem statement, the current state data, and the future state data, and utilize the second machine learning model to assign benefits and priorities to the initiatives, based on the costs of the initiatives, the problem statement, the current state data, and the future state data. The one or more instructions may cause the device to process the initiatives, the benefits of the initiatives, the priorities of the initiatives, and the costs of the initiatives, with the second machine learning model, to generate an initiative plan for solving associated with the problem statement, wherein the initiative plan includes one or more of a roll out plan for the initiative plan, an implementation strategy for the initiative plan, or a cost-benefit analysis for the initiative plan. The one or more instructions may cause the device to perform one or more actions based on the initiative plan.

BRIEF DESCRIPTION OF THE DRAWINGS

FIG. 5 is a flowchart of an example process for utilizing machine learning models to intelligently generate initiative plans.

DETAILED DESCRIPTION

Figure 1A:
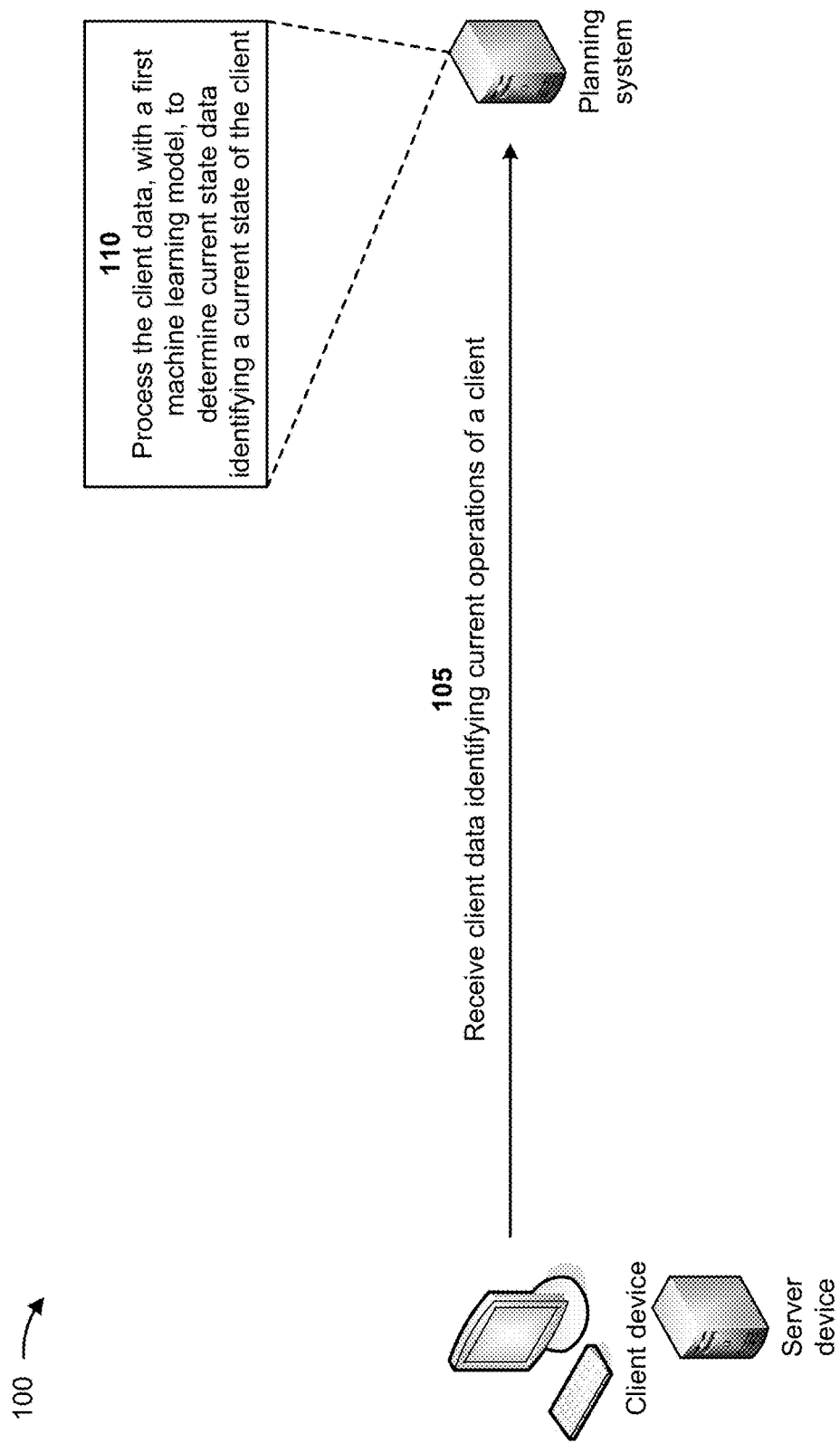
FIGS. 1A-1F are diagrams of an example implementation described herein.

The following detailed description of example implementations refers to the accompanying drawings. The same reference numbers in different drawings may identify the same or similar elements.

Generating an initiative plan is a time consuming and manual process that requires input from multiple experts. For example, preparing an initiative plan requires a wide range of knowledge from many different business disciplines, such as finance, human resource management, intellectual property management, supply chain management, operations management, marketing, and/or the like. Such experts utilize significant computing resources (e.g., processing resources, memory resources, communication resources, and/or the like), networking resources, and/or the like when providing input for the initiative plan and during the creation of the initiative plan.

Some implementations described herein relate to a planning system that utilizes machine learning models to intelligently generate an initiative plan. For example, the planning system may receive client data identifying current operations of a client. The planning system may process the client data, with a first machine learning model, to determine current state data identifying a current state of the client. The planning system may process the current state data and prior client data, with a second machine learning model, to determine a problem statement for the client and future state data identifying a future state of the client. The prior client data may identify challenges, capabilities, processes, and/or key performance indicators (KPIs) associated with other clients. The planning system may utilize the second machine learning model to identify initiatives for the client, and costs of the initiatives, based on the problem statement, the current state data, and the future state data. The planning system may utilize the second machine learning model to assign benefits and priorities to the initiatives based on the costs of the initiatives, the problem statement, the current state data, and the future state data. The planning system may process the initiatives, the benefits of the initiatives, the priorities of the initiatives, and the costs of the initiatives, with the second machine learning model, to generate an initiative plan for solving a problem associated with the problem statement.

In this way, the planning system utilizes machine learning models to intelligently generate an initiative plan. In its entirety, the initiative plan may serve as a roadmap (e.g., a plan) that provides direction to the client. The planning system may provide initiative plans much quicker than current techniques, and may provide benchmarks associated with a peer set, industry best practices, KPIs, value drivers, and/or the like for each initiative plan across a business, business units, a geography, a country, and/or the like. The planning system may include machine learning models that process client data from public websites, investors, annual reports, and/or the like, that utilize latest content from similar clients when determining the initiative plan, and/or the like. This, in turn, conserves computing resources, networking resources, human resources, and/or the like that would otherwise have been wasted in reduced work productivity, lost opportunities for the business, generating incorrect business plans, making poor decisions based on the incorrect business plans, and/or the like.

FIGS. 1A-1F are diagrams of an example 100 associated with utilizing machine learning models to intelligently generate initiative plans. As shown in FIGS. 1A-1F, example 100 includes a user device, a server device, and a planning system. The user device, the server device, and the planning system are described in greater detail below with respect to FIG. 3.

As described herein, the planning system may utilize a multi-phase approach to generate an initiative plan. For example, the multi-phase approach may include a discovery and exploration phase, a validation and execution readiness stage, an executive readout stage, and/or the like. The discovery and exploration phase may obtain and/or analyze client data associated with a client to determine an objective of the client, a current state of the client, a future state of the client, and/or the like. The validation and execution readiness stage may determine a cost associated with an initiative, a benefit associated with an initiative, a prioritization of initiatives, a roadmap for implementing an initiative, and/or the like. The planning system may determine the cost, the benefit, the prioritization, and/or the roadmap based on an analysis of similar initiatives undertaken by entities similar to (e.g., size, market capitalization, location, number of employees, and/or the like) the client. The executive readout stage may include presentation of an initiative plan to the client. For example, the planning system may present an initiative plan via a user interface (e.g., a dashboard) and/or an interactive virtual assistant. The interactive virtual assistant may be configured to pause, answer questions, provide additional information, and/or the like during presentation of the initiative plan.

As shown in FIG. 1A, and by reference number 105, the planning system receives client data identifying current operations of a client. The planning system may source client data from public investors, websites, annual reports, and/or the like. In some implementations, the planning system may obtain the client data based on accessing a data structure (e.g., a database, a table, a list, and/or the like) storing information identifying sources from which the client data is to be obtained. Alternatively, and/or additionally, the planning system may obtain the client data based on user input. For example, a user may input information identifying one or more sources from which the planning system is to obtain the client data. The planning system may obtain the client data based on the information input by the user.

The client data may include financial information of the client, planning documents associated with previous, current, and/or future projects of the client, news articles, investor release information, annual reports, information identifying systems (e.g., an enterprise system, a server device, and/or the like) utilized by the client, system diagnostic information associated with systems utilized by the client, information identifying assets of the client, information identifying locations of the client, information identifying markets associated with the client, and/or the like.

In some implementations, the client data includes other entity data. The other entity data may include client data associated with entities similar to the client. For example, the other entity data may include client data associated with a competitor of the client, an entity operating in a same market as the client, an entity operating in a same geographic area as the client, and/or the like.

The planning system may receive the client data from a client device and/or a server device associated with the client, the planning system, an investor, a website, and/or the like. The planning system may receive the client data periodically (e.g., hourly, daily, weekly, monthly, and/or the like), based on providing a request to the client device and/or the server device, based on an occurrence of an event (e.g., based on receiving an input provided by a user via a user interface associated with the planning system, based on the client registering with the planning system, and/or based on an occurrence of another type of event), and/or the like. Alternatively, and/or additionally, the client data may be input by a user. For example, a user may input one or more portions of the client data to cause the planning system to generate an initiative plan for the client, as described herein.

As shown by reference number 110, the planning system processes the client data, with a first machine learning model, to determine current state data identifying a current state of the client. The first machine learning model may include an inference engine that utilizes predictive modeling to generate an output identifying a current state of the client. The current state of the client may enable a user (e.g., a consultant) to understand the business nuances of the client. In some implementations, the first machine learning model (e.g., the inference engine) may analyze reports (e.g., annual financial reports) of the client and may integrate with external services (e.g., a portfolio analysis service) to generate a detailed analysis of the current state of the client.

In some implementations, the user may adjust and/or modify the output of the inference engine by modifying certain guiderails like business investments of the client, an IT landscape associated with the client, business units of the client. Modifying the output of the inference engine may assist the user with discussing different initiatives with the client. At each step, the planning system may enable the user to provide feedback to the inference engine which may enable the inference engine to refine future outputs. The feedback may be provided via a user interface and/or an interactive virtual assistant. Alternatively, and/or additionally, the inference engine may self-learn by analyzing initiatives selected by the client.

In some implementations, the planning system may perform text analytics on the client data to generate analyzed client data. As an example, the client data may include a document (e.g., a report, an image, a form, and/or the like) associated with the client. The planning system may process the document to extract text from the document. For example, the planning system may perform optical character recognition (OCR) on the document to convert the text into machine-readable code.

The planning system may process the text based on extracting the text from the document. For example, the planning system may remove stop words, perform lemmatization, perform stemming, and/or the like. The planning system may tokenize the text based on processing the text. The planning system may extract one or more features from the text based on tokenizing the text. The planning system may determine one or more characteristics associated with the document based on the extracted features. For example, the planning system may determine an intent or purpose of the document, a sentiment score associated with the document, key phrases included in the document, and/or the like based on tokenizing the text.

The planning system may generate a vector associated with the document based on the extracted features and/or the one or more characteristics associated with the document. The planning system may generate a respective vector for each document included in the client data in a manner similar to that described above.

In some implementations, the planning system compares vectors generated based on documents associated with the client and vectors generated based on documents associated with other entities (e.g., documents included in the other entity data) to generate values indicating similarities between the documents. For example, the planning system may compare a first vector generated based on a first document associated with the client and a second vector generated based on a second document associated with another entity to generate a value indicating a similarity between the first document and the second document. In some implementations, the value is generated based on a cosine similarity between the first vector and the second vector. For example, the value may be generated based on a dot product of the first vector and the second vector. In some implementations, the value may have a range between about −1.0 through 1.0. A value of −1.0 may indicate that the compared documents are exactly opposite to each other. A value of 1.0 may indicate that the compared documents are exactly similar (e.g., identical).

The planning system may generate a cosine similarity matrix corresponding to the analyzed client data based on the values generated based on comparing the generated vectors. The planning system may utilize a density based clustering algorithm (e.g., a DBSCAN algorithm, an affinity propagation algorithm, an agglomerative clustering algorithm, a k-means clustering algorithm, and/or the like) to cluster the documents included in the client data based on the cosine similarity matrix.

In some implementations, the first machine learning model may include a predictive model, and the planning system may utilize the predictive model to determine the state data based on the analyzed client data (e.g., the vectors, the values, the cosine similarity matrix, the clusters, and/or the like). The state data may indicate a current state of the client. For example, the state data may include data identifying current financials of the client, systems diagnostic information associated with the client, process diagnostic information associated with the client, data diagnostic information associated with the client, KPIs associated with the client, information comparing the current state (e.g., KPIs, current financial data, market capitalization data, and/or the like) of the client to current states of other entities similar to the client (e.g., associated with the same business industry, the same market, the same geographic location, the same quantity of employees, the same gross revenue, and/or the like), and/or another type of information indicating a current state of the client.

Figure 1B:
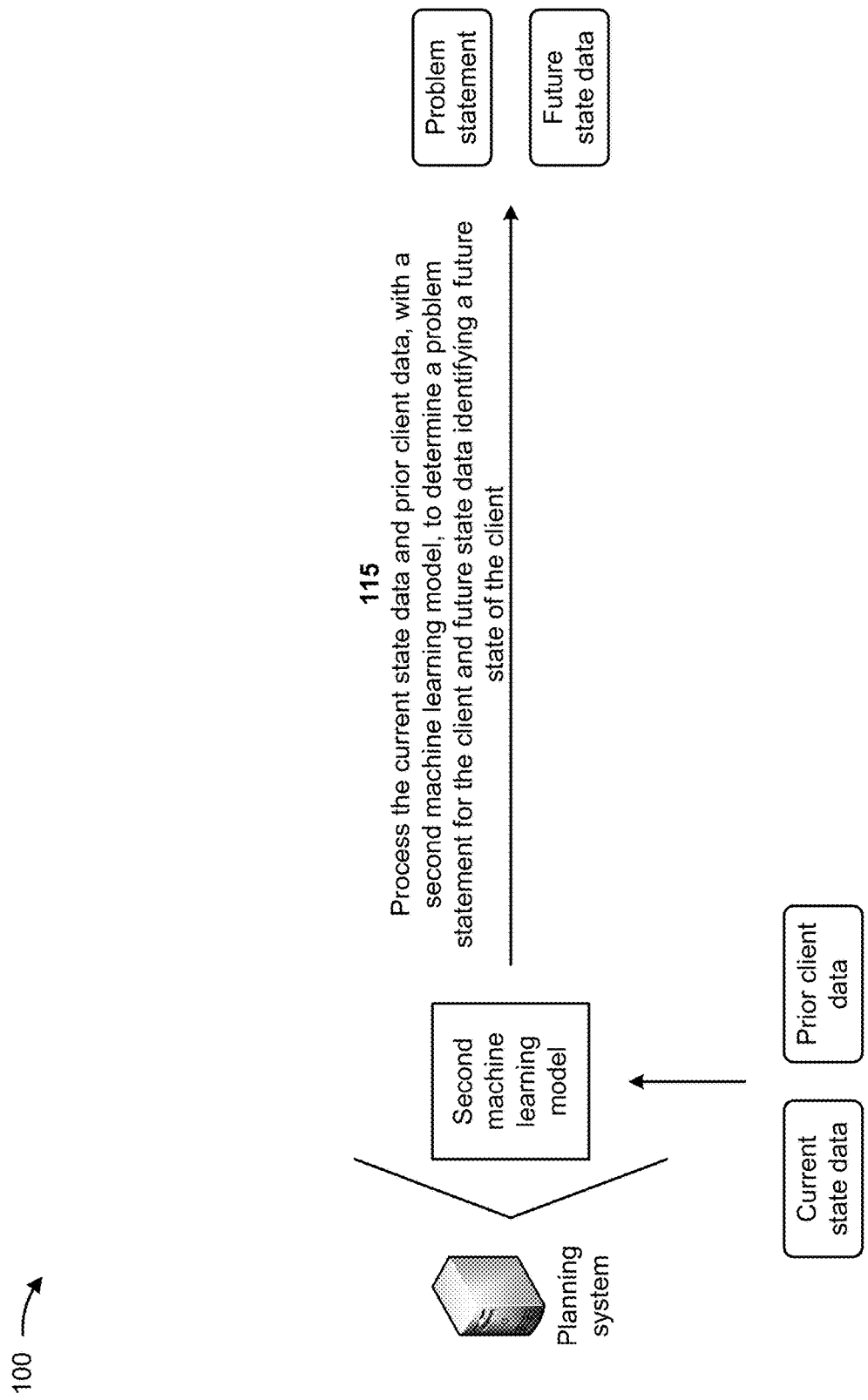

As shown in FIG. 1B, and by reference number 115, the planning system processes the current state data and prior client data, with a second machine learning model, to determine a problem statement for the client and future state data identifying a future state of the client. In some implementations, the second machine learning model includes a recommendation engine and the output of the predictive engine is provided as an input to the recommendation engine. The recommendation model may include a data model that assists in contextualizing and/or customizing an initiative best suited for the client. The recommendation engine may utilize one or more algorithms to filter the prior client data and/or harvest data from previous initiative plans generated by the planning system, sample initiative plans associated with an industry of the client, and/or the like.

The prior client data may identify challenges, capabilities, processes, KPIs, and/or the like associated with other entities (e.g., other clients). The planning system may obtain data indicating one or more challenges (e.g., implementing a new procedure, updating software, increasing production, increasing sales revenue, and/or the like). In some implementations, a user associated with the client (e.g., an employee, a consultant, and/or the like) may input the data indicating the one or more challenges via a user interface associated with the planning system. Alternatively, and/or additionally, the planning system may determine the one or more challenges based on the client data and/or the current state data.

The planning system may utilize the second machine learning model to process the data indicating the one or more challenges, the current state data, and the prior client data to determine challenges associated with other entities that are similar to (e.g., satisfy a matching threshold) the one or more challenges associated with the client. In some implementations, the second machine learning model determines the challenges associated with the other entities based on input provided by practitioners associated with an industry associated with the client, modifications made to the output of the first machine learning model, input provided by the client, and/or the like.

In some implementations, the recommendation engine includes an intelligent algorithm at a backend of the second machine learning model. The algorithm may scan the prior client data to identify a set of business challenges, business capabilities, business processes, KPIs, AS-IS values, process maturity AS-IS state, and/or application landscapes similar to (e.g., satisfying an 85% matching threshold) business challenges, business capabilities, business processes, KPIs, AS-IS values, process maturity AS-IS state, and/or application landscapes associated with the client.

As an example, the planning system may identify a cluster associated with the client based one or more characteristics associated with the client, such as industry, geography, revenue segment, quantity of employees, technology stack, and/or the like. The planning system may generate a vector of data points associated with the client based on the one or more characteristics. The planning system may determine a similarity (e.g., a cosine similarity) between the vector of data points and vectors associated with the identified cluster. The planning system may determine a set of vectors most similar to the vector of data points relative to other vectors associated with the identified cluster based on the comparison. The planning system may determine other entities associated with the set of vectors. The planning system may determine a portion of the prior client data associated with the other entities based on the prior client data and based on the challenges associated with the other entities being similar to the one or more challenges associated with the client.

The planning system may determine the problem statement based on the current state data and the portion of the prior client data associated with the other entities. The planning system may determine challenges, capabilities, processes, KPIs, and/or the like associated with other entities based on the portion of the prior client data associated with the other entities. The planning system may compare the challenges, capabilities, processes, KPIs, and/or the like associated with other entities and the one or more challenges, capabilities, processes, KPIs, and/or the like associated with the client. The planning system may determine the problem statement based on the comparison. For example, the planning system may determine that the other entities are capable of servicing a greater quantity of customers based on the comparison. The planning system may determine a problem statement associated with increasing the client's capability to service customers.

The planning system may determine the future state data based on the problem statement and the prior client data. In some implementations, the future state data may indicate a future state of the client that solves the problem identified in the problem statement. For example, the future state data may indicate a future state of the client that enables the client to service a greater quantity of customers relative to a quantity of customers that the client is currently capable of servicing.

Figure 1C:
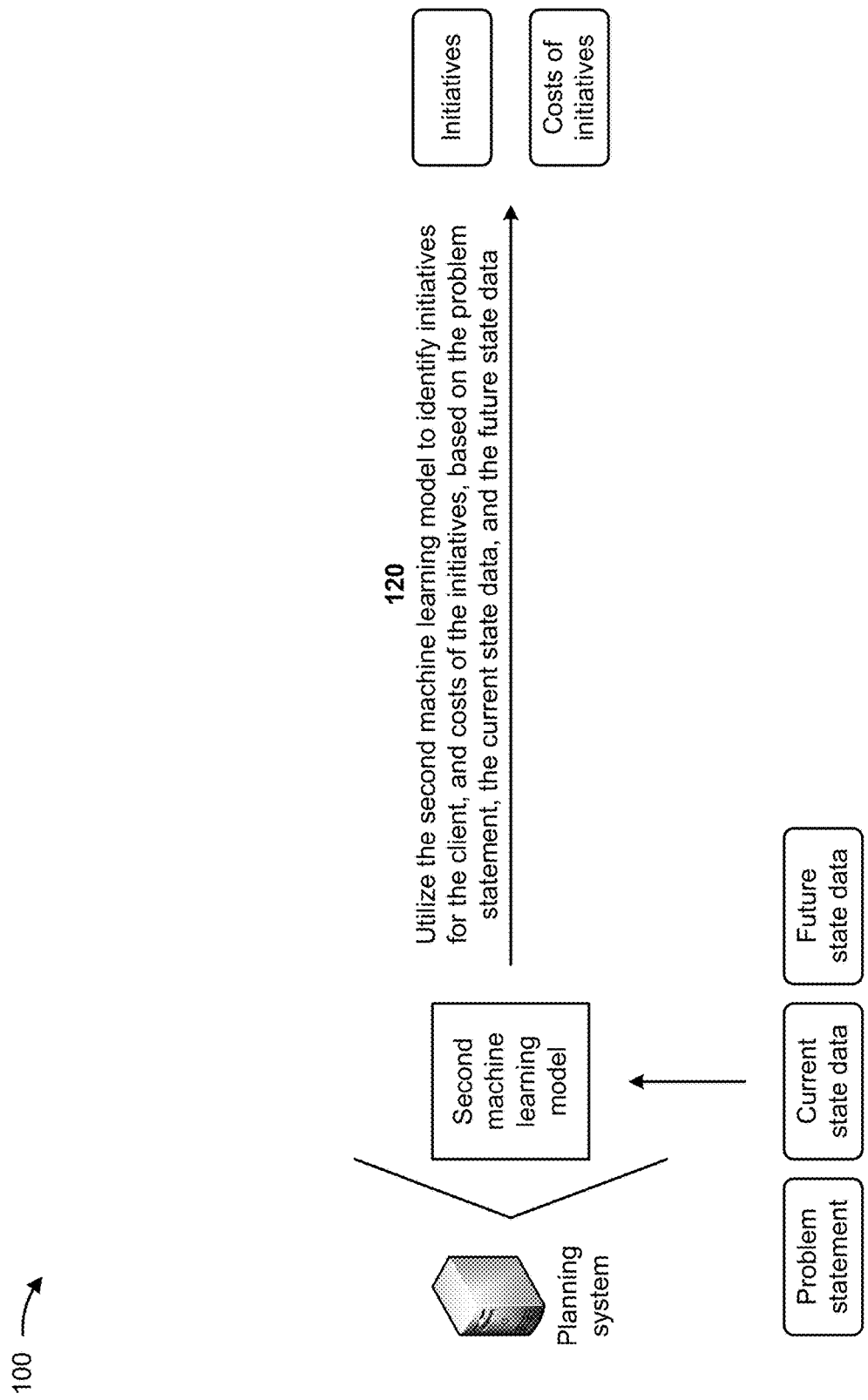

As shown in FIG. 1C, and by reference number 120, the planning system utilizes the second machine learning model to identify initiatives for the client, and costs of the initiatives, based on the problem statement, the current state data, and the future state data. The initiatives for the client may include technological initiatives and/or non-technological initiatives that enable the client to achieve the future state. For example, the future state may be a state associated with the client servicing a greater quantity of clients, as described above. The initiatives for the client may be initiatives that enable the client to increase the quantity of clients that the client is capable of servicing. For example, the planning system may determine an initiative associated with increasing a quantity of employees, increasing a quantity of manufacturing facilities, increasing a quantity of delivery vehicles, adding a new location in a particular geographic location (e.g., a particular city, a particular state, a particular region, and/or the like), updating existing software and/or hardware systems, and/or the like.

The planning system may determine the costs for the initiatives based on the prior client data, the client data, data obtained via a third-party service, and/or the like. For example, the planning system may identify other entities that have undertaken similar initiatives. The planning system may determine a cost incurred by the other entities based on undertaking the similar initiatives. The planning system may determine the costs of the initiatives determined for the client based on the cost incurred by the other entities. Alternatively, and/or additionally, the planning system may determine the cost of the initiatives based on data (e.g., client data, prior client data, data obtained from a third-party service, and/or the like) indicating a current cost of resources associated with the initiatives, such as a current cost of upgrading particular equipment and/or software, a current cost of purchasing land and/or real estate in a particular geographic location, and/or the like.

Figure 1D:
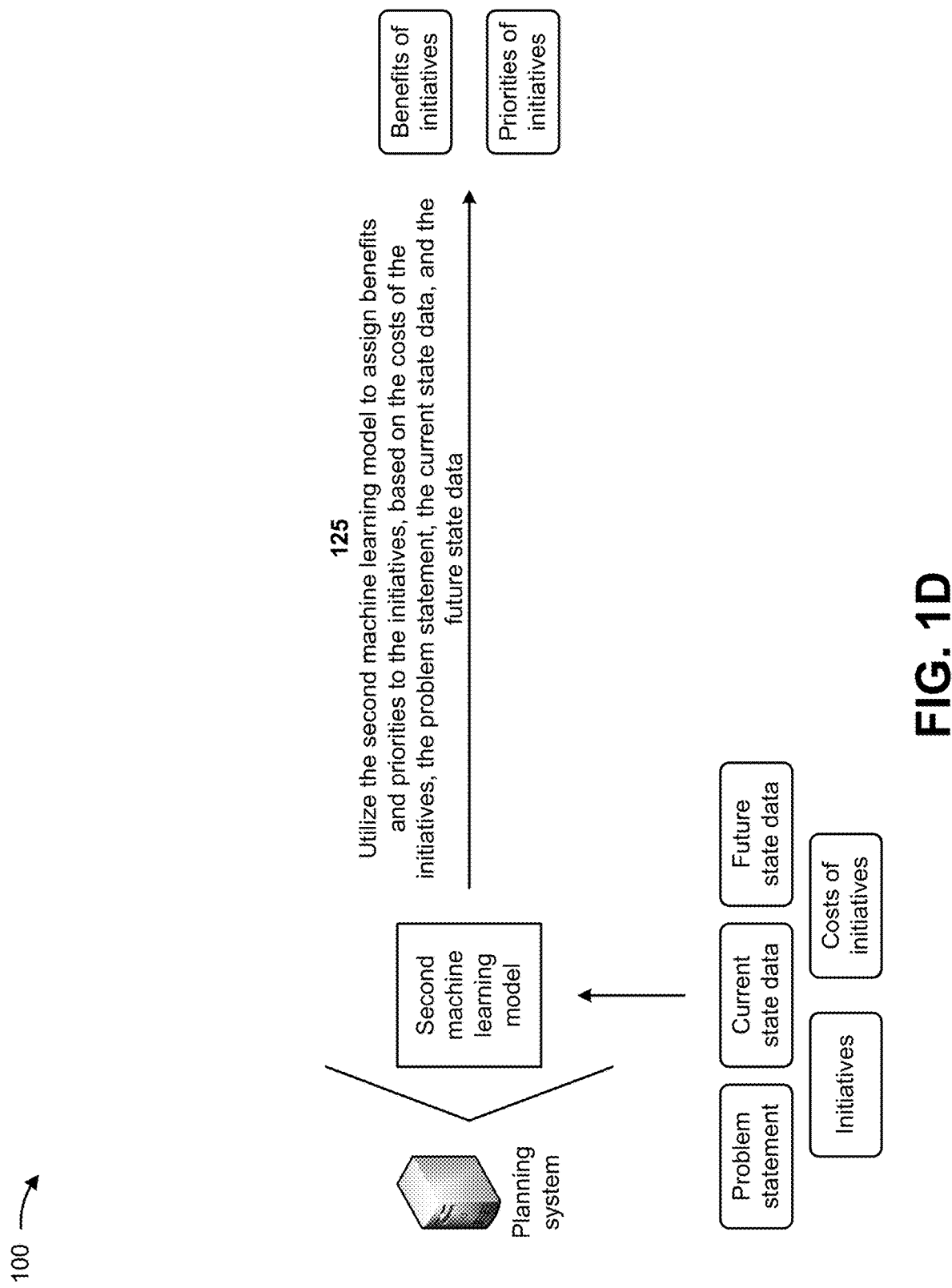

As shown in FIG. 1D, and by reference number 125, the planning system utilizes the second machine learning model to assign benefits and priorities to the initiatives, based on the costs of the initiatives, the problem statement, the current state data, and the future state data. The planning system may assign values to the initiatives based on the costs of the initiatives and/or the benefits of the initiatives. In some implementations, the planning system may determine the benefits of the initiatives based on user input. For example, a user may input one or more benefits of the initiatives via a user interface associated with the planning system. Alternatively, and/or additionally, the planning system may determine the benefits of the initiatives based on the prior client data. The planning system may determine first KPIs associated with another entity prior to undertaking a similar initiative and second KPIs associated with the other entity after undertaking the similar initiative based on the prior client data. The planning system may determine the benefits of the initiative based on the first KPIs and the second KPIs. For example, the planning system may compare the first KPIs and the second KPIs and may determine the benefits of the initiative based on the comparison.

The planning system may assign the priorities to the initiatives based on the values assigned to the initiatives. Alternatively, and/or additionally, the planning system may assign the priorities to the initiatives based on user input indicating one or more criteria associated with assigning the priorities. For example, the user input may include information indicating an importance or weight to be provided to the cost of the initiative, a benefit of the initiative, and/or the like.

Figure 1E:
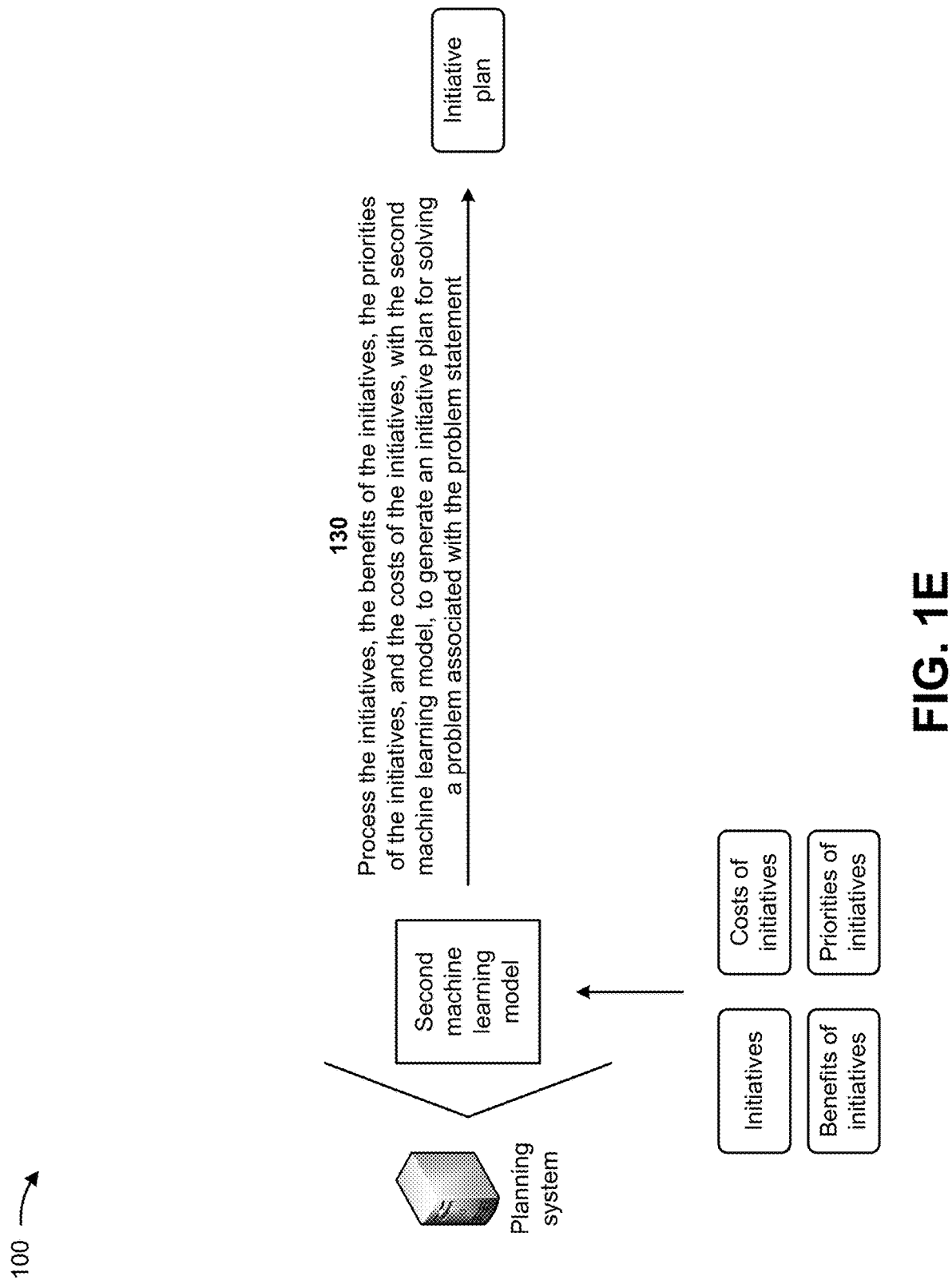

As shown in FIG. 1E, and by reference number 130, the planning system processes the initiatives, the benefits of the initiatives, the priorities of the initiatives, and the costs of the initiatives, with the second machine learning model, to generate an initiative plan for solving a problem associated with the problem statement. The initiative plan may include a roll out plan for the initiative plan, an implementation strategy for the initiative plan, and/or a cost-benefit analysis for the initiative plan. The planning system may determine the roll out plan, the implementation strategy, and/or the cost-benefit analysis for the initiative plan based on the portion of the prior client data associated with the similar vectors.

For example, the planning system may identify a roll out plan, an implementation strategy, and/or a cost-benefit analysis for an initiative plan associated with another entity undertaking a similar initiative based on the portion of the prior client data associated with the similar vectors. The planning system may generate a roll out plan, an implementation strategy, and/or a cost-benefit analysis for an initiative plan associated with the client based on the roll out plan, the implementation strategy, and/or the cost-benefit analysis for the initiative plan associated with the other entity.

In some implementations, the planning system modifies the roll out plan, the implementation strategy, and/or the cost-benefit analysis for the initiative plan associated with the other entity based on user input, a start of the client's financial year, an end of the client's financial year, major public holidays associated with a geographic location associated with the initiative, a period of time (e.g., a week, a month, and/or the like) associated with high volumes of sales and/or productivity of the client, and/or the like.

In some implementations, the planning system determines a plurality of initiative plans. The planning system may process the initiatives, the benefits of the initiatives, the priorities of the initiatives, and the costs of the initiatives, with the second machine learning model, to generate the plurality of initiative plans. The planning system may assign values to the plurality of initiative plans based on corresponding benefits, priorities, and costs of corresponding initiatives in the plurality of initiative plans. The planning system may select the initiative plan from the plurality of initiative plans based on the values.

Figure 1F:
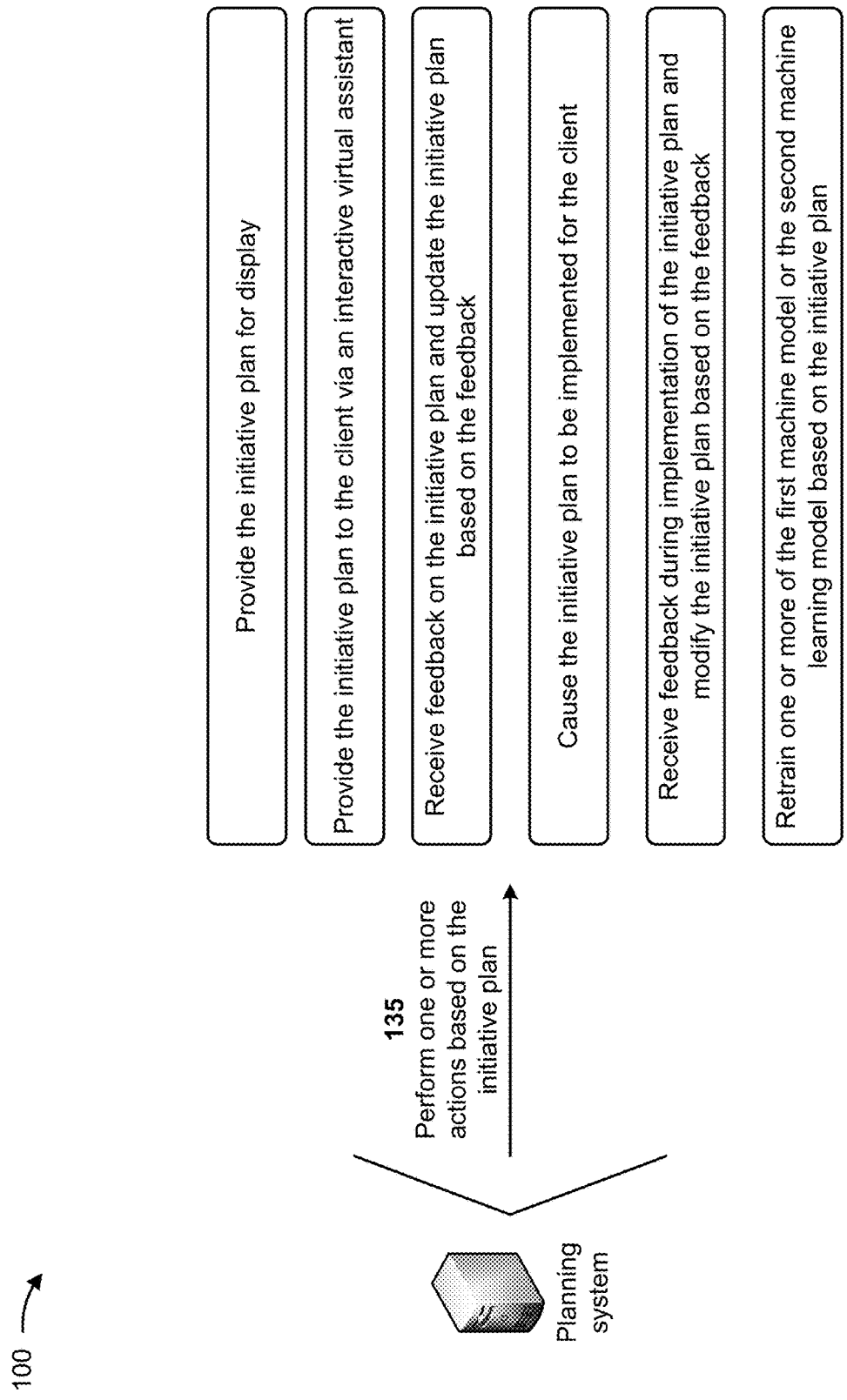

As shown in FIG. 1F, and by reference number 135, the planning system may perform one or more actions based on the initiative plan. In some implementations, the one or more actions include the planning system providing the initiative plan for display. For example, the planning system may provide the initiative plan for display via a user interface provided by a client device associated with the planning system. The user interface may enable a user to view the initiative plan, modify the initiative plan, compare the initiative plan to initiative plans of other entities, view data related to the initiative plan (e.g., the one or more challenges, the costs, the benefits, and/or the like associated with the initiative plan), consolidate the initiative plan with related initiative plans, provide feedback related to the initiative plan, and/or the like.

In some implementations, the one or more actions include the planning system providing the initiative plan to the client via an interactive virtual assistant. The interactive virtual assistant may provide bi-directional communication between the interactive virtual assistant and a user. The interactive virtual assistant may be self-learning. For example, the interactive virtual assistant may determine a response, may provide a query (e.g., "It appears you are attempting to perform a function. May I help you with that?"), and/or the like based on previous interactions with a user. The user may provide a voice input and/or a text input via the interactive virtual assistant, and the interactive virtual assistant may provide one or more portions of the initiative plan based on the voice input and/or the text input.

In some implementations, the one or more actions include the planning system receiving feedback on the initiative plan and updating the initiative plan based on the feedback. The planning system may enable a user to provide feedback on the initiative plan based on a requirement (e.g., approval from a supervisor to move to a next stage of the initiative plan, a completion of a stage of the initiative plan, a cost of a portion of the initiative plan exceeding a cost indicated in the initiative plan, and/or the like) associated with the initiative plan, a configuration setting (e.g., a daily, weekly, and/or monthly prompt requesting feedback from a user), and/or the like.

In some implementations, the planning system utilizes an automatic feedback crawler to obtain the feedback. The automatic feedback crawler may periodically and/or based on an occurrence of an event analyze a system, an application, and/or the like of the client and may generate feedback based on the analysis. In some implementations, the automatic feedback crawler analyzes the planning system and obtains feedback based on a requirement, a configuration, a defined stage of the initiative plan, a phase being executed by the planning system, and/or the like. In some implementations, the requirement, the configuration, the defined stage of the initiative plan, the phase being executed by the planning system are based on a particular application being executed by the planning system, input by a user, and/or the like.

In some implementations, the planning system may obtain feedback based on an occurrence of an error. For example, the planning system may determine an occurrence of a particular error (e.g., an error indicating that a user input an invalid entry into a particular field, an error indicating that a user attempted to execute an unauthorized function, and/or the like). The planning system may automatically obtain data associated with the error based on the occurrence of the error. For example, the planning system may obtain an image of a screen being viewed by a user at a time of the occurrence of the error, data input by the user that resulted in the occurrence of the error, information identifying a function being executed at the time of the occurrence of the error, and/or the like. The planning system may analyze the obtained image, data, information, and/or the like and may determine an update to the initiative plan based on the analysis. In some implementations, the planning system provides information associated with the update to a user and updates the initiative plan based on a response provided by the user. In some implementations, the planning system automatically updates the initiative plan based on the determined update. For example, the planning system may automatically update the initiative plan based on the update being associated with correcting an error, fixing a bug in a software application, and/or the like.

In some implementations, the planning system analyzes the feedback to identify a feature of the planning system that requires attention (e.g., needs to be modified, updated, removed, added, and/or the like). In some implementations, the planning system analyzes the feedback to identify a feature of the planning system that is beneficial to the client. Alternatively, and/or additionally, the planning system may determine that a feature is beneficial to the client based on usage of the particular feature by the client. For example, the planning system may determine that the feature is used more often by the client relative to other features of the planning system, that the feature is used by a larger quantity of employees of the client relative to other features, and/or the like.

In some implementations, the one or more actions include the planning system causing the initiative plan to be implemented for the client. For example, the user may input information approving the initiative plan via the interactive virtual assistant based on the interactive virtual assistant providing the initiative plan to the user. The planning system may cause the initiative plan to be implemented based on the input information.

In some implementations, the one or more actions include the planning system receiving feedback during implementation of the initiative plan and modifying the initiative plan based on the feedback. For example, the planning system may receive feedback during the implementation of the initiative plan in a manner similar to that described above. The planning system may determine a modification to the initiative plan based on the feedback. The planning system may modify the initiative plan automatically and/or based on receiving a user input in response to providing information identifying the modification to the user.

In some implementations, the one or more actions include the planning system retraining one or more of the first machine model or the second machine learning model based on the initiative plan. The planning system may utilize the initiative plan as additional training data for retraining the first machine model or the second machine learning model, thereby increasing the quantity of training data available for training the first machine model or the second machine learning model. Accordingly, the planning system may conserve computing resources associated with identifying, obtaining, and/or generating historical data for training the first machine model or the second machine learning model relative to other systems for identifying, obtaining, and/or generating historical data for training machine learning models.

In this way, the planning system utilizes machine learning models to intelligently generate initiative plans. The planning system may provide initiative plans (e.g., business plans) much quicker than current techniques, and may provide benchmarks associated with a peer set, industry best practices, key performance indicators, value drivers, and/or the like for each initiative plan across a business, business units, a geography, a country, and/or the like. The planning system may include machine learning models that process client data from public websites, investors, annual reports, and/or the like, that utilize latest content from similar clients when determining the initiative plan, and/or the like. This, in turn, conserves computing resources, networking resources, human resources, and/or the like that would otherwise have been wasted in reduced work productivity, lost opportunities for the business, generating incorrect business plans, making poor decisions based on the incorrect business plans, and/or the like.

As indicated above, FIGS. 1A-1F are provided as an example. Other examples may differ from what is described with regard to FIGS. 1A-1F. The number and arrangement of devices shown in FIGS. 1A-1F are provided as an example. In practice, there may be additional devices, fewer devices, different devices, or differently arranged devices than those shown in FIGS. 1A-1F. Furthermore, two or more devices shown in FIGS. 1A-1F may be implemented within a single device, or a single device shown in FIGS. 1A-1F may be implemented as multiple, distributed devices. Additionally, or alternatively, a set of devices (e.g., one or more devices) shown in FIGS. 1A-1F may perform one or more functions described as being performed by another set of devices shown in FIGS. 1A-1F.

Figure 2:
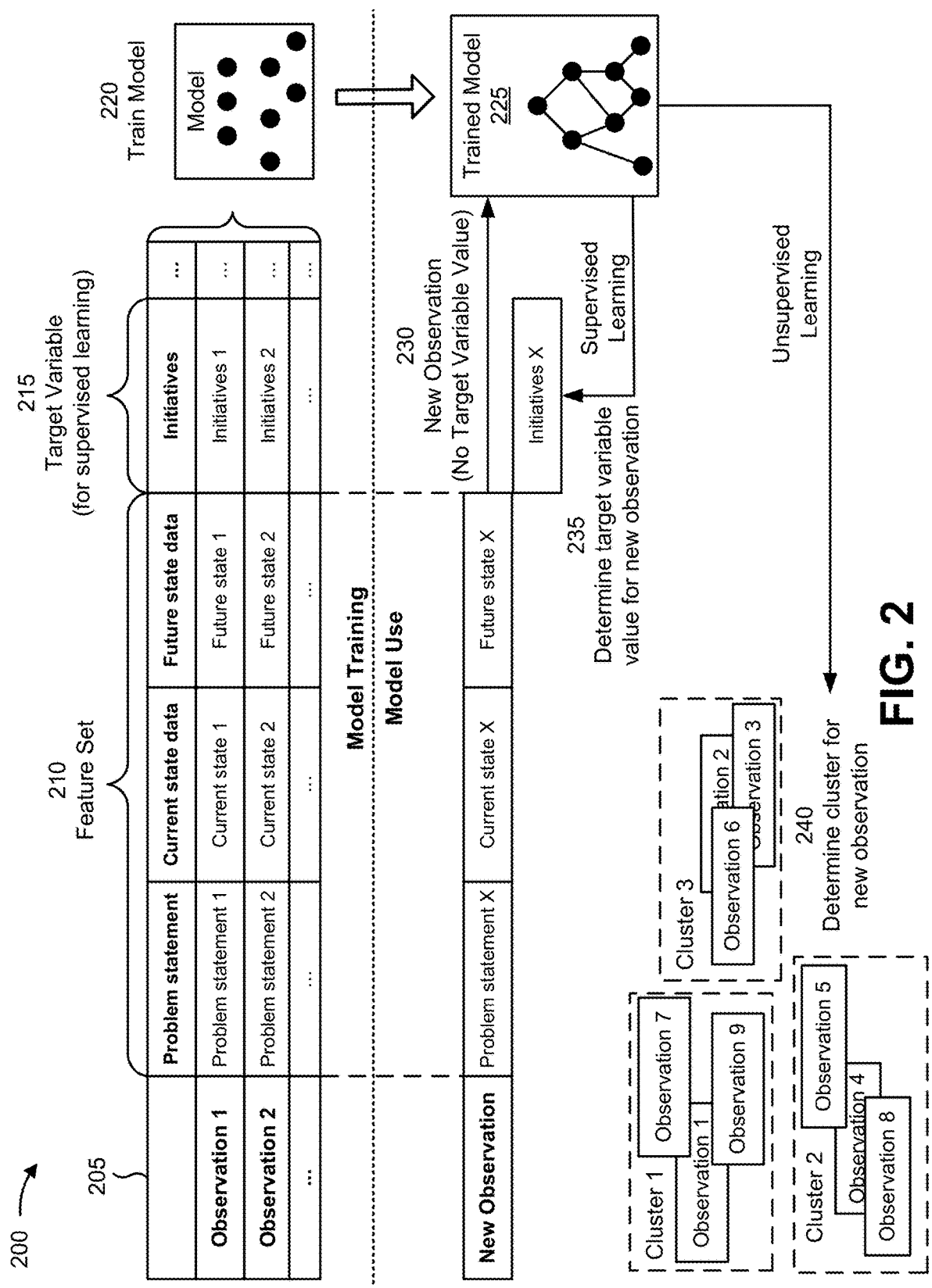
FIG. 2 is a diagram illustrating an example of training and using a machine learning model in connection with intelligently generating initiative plans.

FIG. 2 is a diagram illustrating an example 200 of training and using a machine learning model (e.g., the first machine learning model and/or the second machine learning model) in connection with intelligently generating initiative plans. The machine learning model training and usage described herein may be performed using a machine learning system. The machine learning system may include or may be included in a computing device, a server, a cloud computing environment, and/or the like, such as the planning system described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the planning system, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the planning system. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of a problem statement, a second feature of current state data, a third feature of future state data, and so on. As shown, for a first observation, the first feature may have a value of problem statement 1, the second feature may have a value of current state 1, the third feature may have a value of future state 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable is initiatives, which has a value of initiatives 1 for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of problem statement X, a second feature of current state X, a third feature of future state X, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of initiatives X for the target variable of the initiatives for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., a problem statement cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a current state data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to intelligently generating initiative plans. The machine learning system enables recognition and/or identification of tens, hundreds, thousands, or millions of features and/or feature values for tens, hundreds, thousands, or millions of observations, thereby increasing accuracy and consistency and reducing delay associated with intelligently generating initiative plans relative to requiring computing resources to be allocated for tens, hundreds, or thousands of operators to manually generate initiative plans.

As indicated above, FIG. 2 is provided as an example. Other examples may differ from what is described in connection with FIG. 2.

Figure 3:
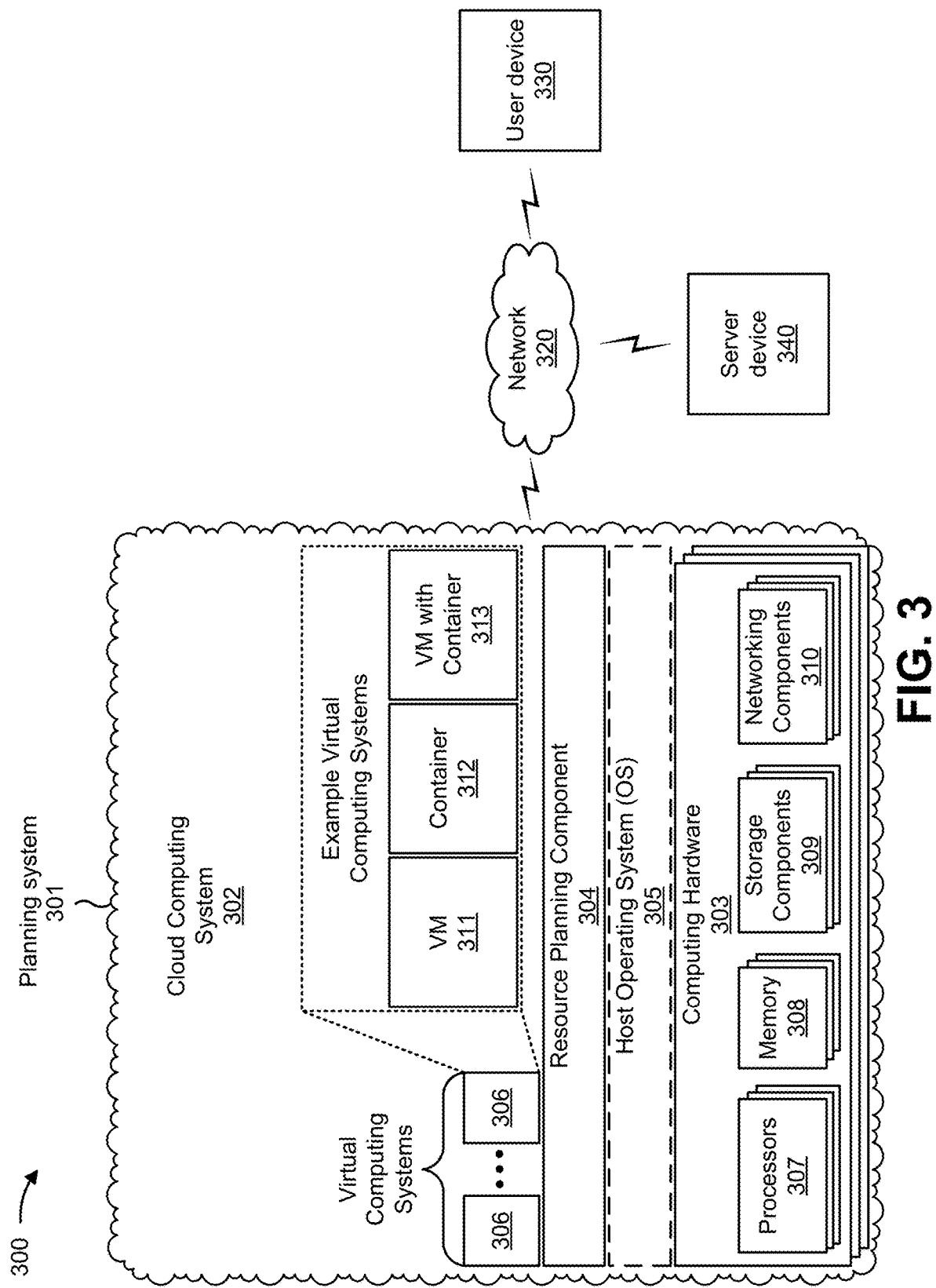
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a planning system 301, which may include one or more elements of and/or may execute within a cloud computing system 302. The cloud computing system 302 may include one or more elements 303-313, as described in more detail below. As further shown in FIG. 3, environment 300 may include a network 320, a user device 330, and/or a server device 340. Devices and/or elements of environment 300 may interconnect via wired connections and/or wireless connections.

The cloud computing system 302 includes computing hardware 303, a resource management component 304, a host operating system (OS) 305, and/or one or more virtual computing systems 306. The resource management component 304 may perform virtualization (e.g., abstraction) of computing hardware 303 to create the one or more virtual computing systems 306. Using virtualization, the resource management component 304 enables a single computing device (e.g., a computer, a server, and/or the like) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

Computing hardware 303 includes hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, and/or the like) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using computing hardware 303. As shown, a virtual computing system 306 may include a virtual machine 311, a container 312, a hybrid environment 313 that includes a virtual machine and a container, and/or the like. A virtual computing system 306 may execute one or more applications using a file system that includes binary files, software libraries, and/or other resources required to execute applications on a guest operating system (e.g., within the virtual computing system 306) or the host operating system 305.

Although the planning system 301 may include one or more elements 303-313 of the cloud computing system 302, may execute within the cloud computing system 302, and/or may be hosted within the cloud computing system 302, in some implementations, the planning system 301 may not be cloud-based (e.g., may be implemented outside of a cloud computing system) or may be partially cloud-based. For example, the planning system 301 may include one or more devices that are not part of the cloud computing system 302, such as device 400 of FIG. 4, which may include a standalone server or another type of computing device. The planning system 301 may perform one or more operations and/or processes described in more detail elsewhere herein.

Network 320 includes one or more wired and/or wireless networks. For example, network 320 may include a cellular network, a public land mobile network (PLMN), a local area network (LAN), a wide area network (WAN), a private network, the Internet, and/or the like, and/or a combination of these or other types of networks. The network 320 enables communication among the devices of environment 300.

User device 330 includes one or more devices capable of receiving, generating, storing, processing, and/or providing information, as described elsewhere herein. User device 330 may include a communication device and/or a computing device. For example, user device 330 may include a wireless communication device, a user equipment (UE), a mobile phone (e.g., a smart phone or a cell phone, among other examples), a laptop computer, a tablet computer, a handheld computer, a desktop computer, a gaming device, a wearable communication device (e.g., a smart wristwatch or a pair of smart eyeglasses, among other examples), an Internet of Things (IoT) device, or a similar type of device. User device 330 may communicate with one or more other devices of environment 300, as described elsewhere herein.

Server device 340 includes one or more devices capable of receiving, generating, storing, processing, providing, and/or routing information, as described elsewhere herein. Server device 340 may include a communication device and/or a computing device. For example, server device 340 may include a server, such as an application server, a client server, a web server, a database server, a host server, a proxy server, a virtual server (e.g., executing on computing hardware), or a server in a cloud computing system. In some implementations, server device 340 includes computing hardware used in a cloud computing environment.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of environment 300 may perform one or more functions described as being performed by another set of devices of environment 300.

Figure 4:
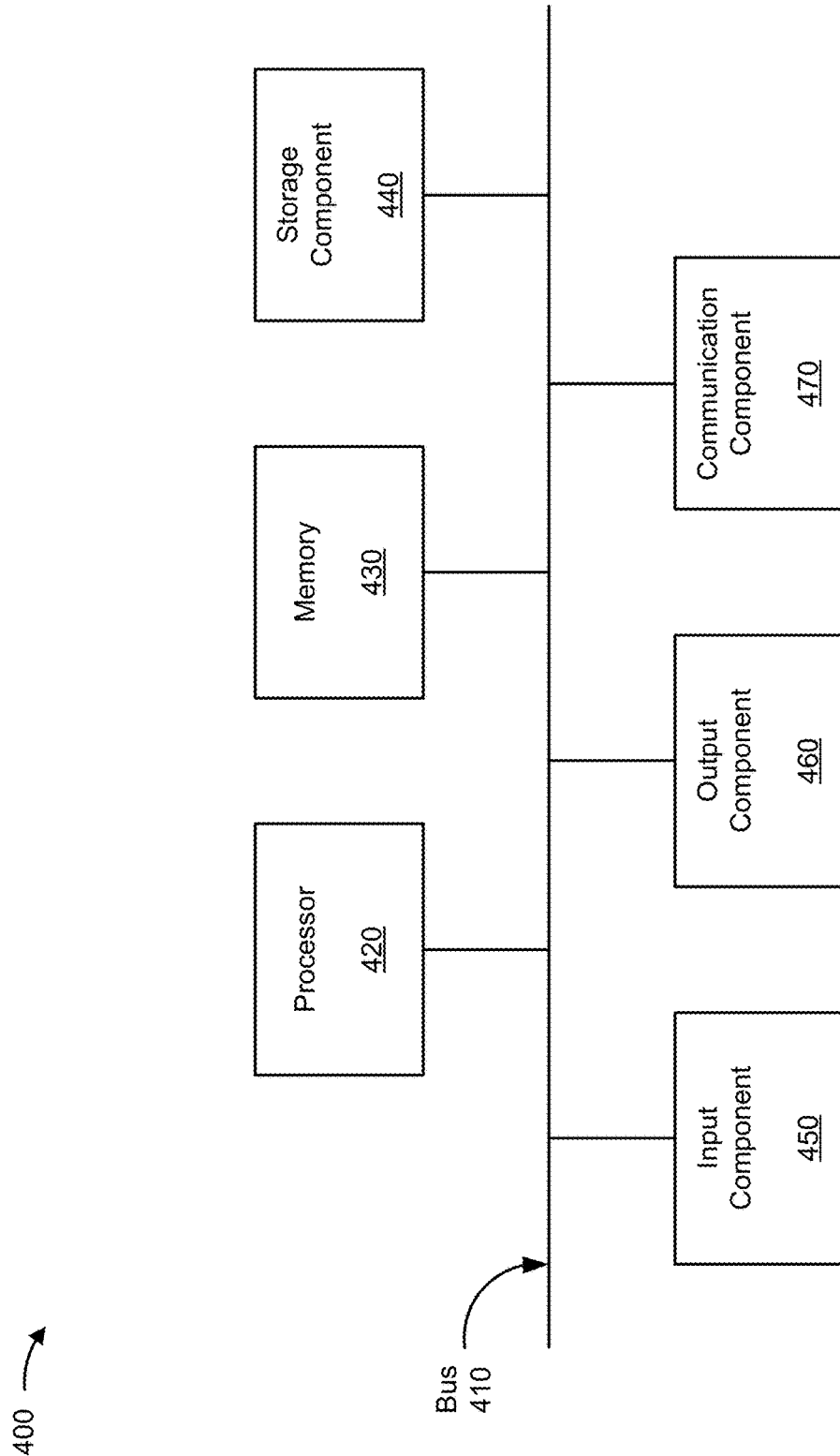
FIG. 4 is a diagram of example components of one or more devices of FIG. 3.

FIG. 4 is a diagram of example components of a device 400, which may correspond to planning system 301, user device 330, and/or server device 340. In some implementations, planning system 301, user device 330, and/or server device 340 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random-access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid-state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 for utilizing machine learning models to intelligently generate initiative plans. In some implementations, one or more process blocks of FIG. 5 may be performed by a device (e.g., planning system 301). In some implementations, one or more process blocks of FIG. 5 may be performed by another device or a group of devices separate from or including the device, such as a user device (e.g., user device 330) and/or a server device (e.g., server device 340). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include receiving client data identifying current operations of a client (block 510). For example, the device may receive client data identifying current operations of a client, as described above. The device may receive the client data from investor reports, websites, and/or financial reports.

As further shown in FIG. 5, process 500 may include processing the client data, with a first machine learning model, to determine current state data identifying a current state of the client (block 520). For example, the device may process the client data, with a first machine learning model, to determine current state data identifying a current state of the client, as described above. In some implementations, the device may perform text analytics on the client data to generate analyzed client data. The device may process the analyzed client data, with a predictive model, to determine the current state data.

As further shown in FIG. 5, process 500 may include processing the current state data and prior client data, with a second machine learning model, to determine a problem statement for the client and future state data identifying a future state of the client (block 530). For example, the device may process the current state data and prior client data, with a second machine learning model, to determine a problem statement for the client and future state data identifying a future state of the client, as described above. In some implementations, the prior client data identifies at least one of challenges, capabilities, processes, or KPIs associated with other clients. The at least one of the challenges, the capabilities, the processes, or the key performance indicators associated with the other clients may satisfy a matching threshold associated with the client.

In some implementations, the device may define the problem statement based on the current state data and the prior client data. The device may determine the future state data based on the problem statement and the prior client data. In some implementations, the future state of the client may address the problem statement.

As further shown in FIG. 5, process 500 may include utilizing the second machine learning model to identify initiatives for the client, and costs of the initiatives, based on the problem statement, the current state data, and the future state data (block 540). For example, the device may utilize the second machine learning model to identify initiatives for the client, and costs of the initiatives, based on the problem statement, the current state data, and the future state data, as described above. The initiatives for the client may include technological initiatives and/or non-technological initiatives that cause the client to achieve the future state.

As further shown in FIG. 5, process 500 may include utilizing the second machine learning model to assign benefits and priorities to the initiatives, based on the costs of the initiatives, the problem statement, the current state data, and the future state data (block 550). For example, the device may utilize the second machine learning model to assign benefits and priorities to the initiatives, based on the costs of the initiatives, the problem statement, the current state data, and the future state data, as described above.

The device may assign the benefits to the initiatives based on the problem statement, the current state data, and the future state data. The device may assign values to the initiatives based on the costs of the initiatives and the benefits of the initiatives. The device may assign the priorities to the initiatives based on the values assigned to the initiatives.

As further shown in FIG. 5, process 500 may include processing the initiatives, the benefits of the initiatives, the priorities of the initiatives, and the costs of the initiatives, with the second machine learning model, to generate an initiative plan for solving a problem associated with the problem statement (block 560). For example, the device may process the initiatives, the benefits of the initiatives, the priorities of the initiatives, and the costs of the initiatives, with the second machine learning model, to generate an initiative plan for solving a problem associated with the problem statement, as described above. The initiative plan may include a roll out plan for the initiative plan, an implementation strategy for the initiative plan, and/or a cost-benefit analysis for the initiative plan.

In some implementations, the device may process the initiatives, the benefits of the initiatives, the priorities of the initiatives, and the costs of the initiatives, with the second machine learning model, to generate a plurality of initiative plans. The device may assign values to the plurality of initiative plans based on corresponding benefits, priorities, and costs of corresponding initiatives in the plurality of initiative plans. The device may select the initiative plan from the plurality of initiative plans based on the values.

As further shown in FIG. 5, process 500 may include performing one or more actions based on the initiative plan (block 570). For example, the device may perform one or more actions based on the initiative plan, as described above. The one or more actions may include the device causing the initiative plan to be implemented for the client, retraining one or more of the first machine learning model or the second machine learning model based on the initiative plan, providing the initiative plan for display, providing the initiative plan to the client via an interactive virtual assistant, receiving feedback on the initiative plan and updating the initiative plan based on the feedback, receiving feedback during implementation of the initiative plan for the client, modifying the initiative plan based on the feedback to generate a modified initiative plan, causing the modified initiative plan to be implemented for the client, providing the initiative plan to the client via an interactive virtual assistant, receiving feedback on the initiative plan via the interactive virtual assistant, and/or updating the initiative plan based on the feedback.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, and/or the like, depending on the context.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method utilizing machine learning models to intelligently generate initiative plan for an entity, comprising:
   receiving, by a device, client data identifying current operations of a client from a remote server device;
   processing, by the device, the client data, with a first machine learning model, to determine current state data identifying a current state of the client,
      wherein processing the client data, with the first machine learning model, to determine the current state data comprises:
         performing text analytics on the client data by extracting one or more features from text of the client data based on tokenizing the text,
         determining one or more characteristics associated with the client data based on the extracted features,
         generating a vector associated with the client data based on the extracted features and/or the one or more characteristics associated with the client data to generate analyzed client data; and
         processing the analyzed client data, with a predictive model, to determine the current state data;
   processing, by the device, the current state data and prior client data, with a second machine learning model, to determine a problem statement for the client and future state data identifying a future state of the client,
      wherein the prior client data identifies at least one of challenges, capabilities, processes, or key performance indicators (KPIs) associated with other clients;
   utilizing, by the device, the second machine learning model to identify initiatives for the client, and costs of the initiatives, based on the problem statement, the current state data, and the future state data;
   utilizing, by the device, the second machine learning model to assign benefits and priorities to the initiatives, based on the costs of the initiatives, the problem statement, the current state data, and the future state data,
      wherein the benefits of the initiatives are determined by:
         determining first KPIs associated with another entity that is different than the entity, prior to undertaking other initiatives that are similar to the initiatives,
         determining second KPIs associated with the other entity after undertaking the other initiatives based on the prior client data,
         determining the benefits of the initiatives based on comparing the first KPIs and the second KPIs;
   processing, by the device, the initiatives, the benefits of the initiatives, the priorities of the initiatives, and the costs of the initiatives, with the second machine learning model, to generate the initiative plan for solving a problem associated with the problem statement; and
   performing, by the device, one or more actions based on the initiative plan, wherein the one or more actions are performed by:
      causing the initiative plan to be implemented for the client;
      receiving feedback during implementation of the initiative plan for the client;
      modifying the initiative plan based on the feedback and to generate a modified initiative plan;
      causing the modified initiative plan to be implemented for the client;
      in an event of an error indicated by the feedback, automatically obtaining, by the device, data associated with the error, the data including:
         an image of a screen viewed by a user at a time of occurrence of the error,
         data input by the user that resulted in the occurrence of the error, and
         information identifying a function executed at the time of occurrence of the error;
      analyzing, by the device, the obtained image, data and information;
      determining, by the device, an update to the modified initiative plan based on the analysis; and automatically updating, by the device, the modified initiative plan based on the determined update to correct the error.

2. The method of claim 1, wherein receiving the client data identifying the current operations of the client comprises:
receiving the client data from one or more of investor reports, websites, or financial reports.

3. The method of claim 1, wherein the at least one of the challenges, the capabilities, the processes, or the key performance indicators associated with the other clients satisfies a matching threshold associated with the client.

4. The method of claim 1, wherein processing the current state data and the prior client data, with the second machine learning model, to determine the problem statement for the client and the future state data comprises:
defining the problem statement based on the current state data and the prior client data; and
determining the future state data based on the problem statement and the prior client data,
wherein the future state of the client addresses the problem statement.

5. The method of claim 1, wherein the initiatives for the client include technological initiatives and non-technological initiatives that cause the client to achieve the future state.

6. The method of claim 1, wherein utilizing the second machine learning model to assign the benefits and the priorities to the initiatives comprises:
assigning the benefits to the initiatives based on the problem statement, the current state data, and the future state data;
assigning values to the initiatives based on the costs of the initiatives and the benefits of the initiatives; and
assigning the priorities to the initiatives based on the values assigned to the initiatives.

7. A device utilizing machine learning models to intelligently generate initiative plan for an entity, comprising:
one or more memories; and
one or more processors, communicatively coupled to the one or more memories, configured to:
receive client data identifying current operations of a client from a remote server device;
process the client data, with a first machine learning model, to determine current state data identifying a current state of the client,
wherein to process the client data, with the first machine learning model, to determine the current state data comprises:
perform text analytics on the client data by extracting one or more features from text of the client data based on tokenizing the text,
determine one or more characteristics associated with the client data based on the extracted features,
generate a vector associated with the client data based on the extracted features and/or the one or more characteristics associated with the client data to generate analyzed client data; and
process the analyzed client data, with a predictive model, to determine the current state data;
process the current state data and prior client data, with a second machine learning model, to determine a problem statement for the client and future state data identifying a future state of the client,
wherein the prior client data identifies at least one of challenges, capabilities, processes, or key performance indicators (KPIs) associated with other clients;
utilize the second machine learning model to identify initiatives for the client, and costs of the initiatives, based on the problem statement, the current state data, and the future state data,
wherein the initiatives for the client include technological initiatives and non-technological initiatives that cause the client to achieve the future state;
utilize the second machine learning model to assign benefits and priorities to the initiatives, based on the costs of the initiatives, the problem statement, the current state data, and the future state data,
wherein the benefits of the initiatives are determined by:
determining first KPIs associated with another entity that is different than the entity, prior to undertaking other initiatives that are similar to the initiatives,
determining second KPIs associated with the other entity after undertaking the other initiatives based on the prior client data,
determining the benefits of the initiatives based on comparing the first KPIs and the second KPIs;
process the initiatives, the benefits of the initiatives, the priorities of the initiatives, and the costs of the initiatives, with the second machine learning model, to generate the initiative plan for solving a problem associated with the problem statement; and
perform one or more actions based on the initiative plan, wherein the one or more actions are performed by:
causing the initiative plan to be implemented for the client;
receiving feedback during implementation of the initiative plan for the client;
modifying the initiative plan based on the feedback and to generate a modified initiative plan;
causing the modified initiative plan to be implemented for the client;
in an event of an error indicated by the feedback, automatically obtaining data associated with the error, the data including:
an image of a screen viewed by a user at a time of occurrence of the error;
data input by the user that resulted in the occurrence of the error; and
information identifying a function executed at the time of occurrence of the error;
analyzing the obtained image, data and information;
determining an update to the modified initiative plan based on the analysis; and
automatically updating the modified initiative plan based on the determined update to correct the error.

8. The device of claim 7, wherein the one or more processors, when processing the initiatives, the benefits of the initiatives, the priorities of the initiatives, and the costs of the initiatives, with the second machine learning model, to generate the initiative plan, are configured to:
process the initiatives, the benefits of the initiatives, the priorities of the initiatives, and the costs of the initiatives, with the second machine learning model, to generate a plurality of initiative plans;
assign values to the plurality of initiative plans based on corresponding benefits, priorities, and costs of corresponding initiatives in the plurality of initiative plans; and
select the initiative plan from the plurality of initiative plans based on the values.

9. The device of claim 7, wherein the initiative plan includes one or more of:
   a roll out plan for the initiative plan,
   an implementation strategy for the initiative plan, or
   a cost-benefit analysis for the initiative plan.

10. The device of claim 7, wherein the one or more processors, when performing the one or more actions, are configured to:
    retrain one or more of the first machine learning model and the second machine learning model based on the initiative plan.

11. The device of claim 7, wherein the one or more processors, when performing the one or more actions, are configured to one or more of:
    provide the initiative plan for display;
    provide the initiative plan to the client via an interactive virtual assistant; or
    receive feedback on the initiative plan and update the initiative plan based on the feedback.

12. The device of claim 7, wherein the one or more processors, when performing the one or more actions, are configured to:
    provide the initiative plan to the client via an interactive virtual assistant;
    receive feedback on the initiative plan via the interactive virtual assistant; and
    update the initiative plan based on the feedback.

13. A non-transitory computer-readable medium storing a set of instructions utilizing machine learning models to intelligently generate initiative plan for an entity, the set of instructions comprising:
    one or more instructions that, when executed by one or more processors of a device, cause the device to:
    receive client data identifying current operations of a client from a remote server device;
    process the client data, with a first machine learning model, to determine current state data identifying a current state of the client,
      wherein to process the client data, with the first machine learning model, to determine the current state data comprises:
        perform text analytics on the client data by extracting one or more features from text of the client data based on tokenizing the text,
        determine one or more characteristics associated with the client data based on the extracted features,
        generate a vector associated with the client data based on the extracted features and/or the one or more characteristics associated with the client data to generate analyzed client data; and
        process the analyzed client data, with a predictive model, to determine the current state data;
    process the current state data and prior client data, with a second machine learning model, to determine a problem statement for the client and future state data identifying a future state of the client,
      wherein the prior client data identifies at least one of challenges, capabilities, processes, or key performance indicators (KPIs) associated with other clients;
    utilize the second machine learning model to identify initiatives for the client, and costs of the initiatives, based on the problem statement, the current state data, and the future state data;
    utilize the second machine learning model to assign benefits and priorities to the initiatives, based on the costs of the initiatives, the problem statement, the current state data, and the future state data,
      wherein the benefits of the initiatives are determined by:
        determining first KPIs associated with another entity that is different than the entity, prior to undertaking other initiatives that are similar to the initiatives,
        determining second KPIs associated with the other entity after undertaking the other initiatives based on the prior client data,
        determining the benefits of the initiatives based on comparing the first KPIs and the second KPIs;
    process the initiatives, the benefits of the initiatives, the priorities of the initiatives, and the costs of the initiatives, with the second machine learning model, to generate the initiative plan for solving associated with the problem statement,
      wherein the initiative plan includes one or more of:
        a roll out plan for the initiative plan,
        an implementation strategy for the initiative plan, or
        a cost-benefit analysis for the initiative plan; and
    perform one or more actions based on the initiative plan,
      wherein the one or more actions are performed by:
      causing the initiative plan to be implemented for the client;
      receiving feedback during implementation of the initiative plan for the client;
      modifying the initiative plan based on the feedback and to generate a modified initiative plan;
      causing the modified initiative plan to be implemented for the client;
      in an event of an error indicated by the feedback, automatically obtaining data associated with the error, the data including:
        an image of a screen viewed by a user at a time of occurrence of the error;
        data input by the user that resulted in the occurrence of the error; and
        information identifying a function executed at the time of occurrence of the error;
      analyzing the obtained image, data and information;
      determining an update to the modified initiative plan based on the analysis; and
      automatically updating the modified initiative plan based on the determined update to correct the error.

14. The non-transitory computer-readable medium of claim 13, wherein the one or more instructions, that cause the device to process the initiatives, the benefits of the initiatives, the priorities of the initiatives, and the costs of the initiatives, with the second machine learning model, to generate the initiative plan, cause the device to:
    process the initiatives, the benefits of the initiatives, the priorities of the initiatives, and the costs of the initiatives, with the second machine learning model, to generate a plurality of initiative plans;

assign values to the plurality of initiative plans based on corresponding benefits, priorities, and costs of corresponding initiatives in the plurality of initiative plans; and select the initiative plan from the plurality of initiative plans based on the values.

15. The non-transitory computer-readable medium of claim 13, wherein the one or more instructions, that cause the device to perform the one or more actions, cause the device to one or more of:

retrain one or more of the first machine learning model or the second machine learning model based on the initiative plan;

provide the initiative plan for display;

provide the initiative plan to the client via an interactive virtual assistant; or receive feedback on the initiative plan and update the initiative plan based on the feedback.

16. The non-transitory computer-readable medium of claim 13, wherein the one or more instructions, that cause the device to perform the one or more actions, cause the device to:

provide the initiative plan to the client via an interactive virtual assistant;

receive feedback on the initiative plan via the interactive virtual assistant; and update the initiative plan based on the feedback.

* * * * *